(12) United States Patent
Gretz

(10) Patent No.: US 8,686,287 B1
(45) Date of Patent: Apr. 1, 2014

(54) SURFACE MOUNT ELECTRICAL BOX FOR SHALLOW WALL CAVITIES

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 695 days.

(21) Appl. No.: 12/930,399

(22) Filed: Jan. 6, 2011

(51) Int. Cl.
    H02G 3/10 (2006.01)
    H02G 3/12 (2006.01)
    H01H 9/02 (2006.01)

(52) U.S. Cl.
    USPC ............... 174/58; 174/502; 174/50; 248/906; 439/535; 220/4.02

(58) Field of Classification Search
    USPC ............... 174/50, 58, 502; 248/906; 439/535; 220/4.02
    See application file for complete search history.

(56) References Cited

U.S. PATENT DOCUMENTS

| | | | | |
|---|---|---|---|---|
| 2,048,611 A * | 7/1936 | Kranz | ............... | 174/57 |
| 3,288,910 A * | 11/1966 | Zerwes | ............... | 174/53 |
| 4,059,327 A | 11/1977 | Vann | | |
| 4,936,794 A | 6/1990 | Shaw et al. | | |
| 5,135,411 A * | 8/1992 | Wiley et al. | ............... | 439/535 |
| 5,603,424 A * | 2/1997 | Bordwell et al. | ............... | 220/3.5 |
| 6,239,368 B1 * | 5/2001 | Gretz | ............... | 174/57 |
| 6,268,563 B1 * | 7/2001 | Gretz | ............... | 174/53 |
| 6,355,882 B1 * | 3/2002 | Gretz | ............... | 174/53 |
| 6,545,216 B1 | 4/2003 | Bell et al. | | |
| 6,677,523 B1 * | 1/2004 | Gretz | ............... | 174/63 |
| 6,723,921 B2 * | 4/2004 | Vagedes | ............... | 174/58 |
| 6,786,766 B1 * | 9/2004 | Chopra | ............... | 439/535 |
| 6,825,414 B2 * | 11/2004 | Vagedes | ............... | 174/58 |
| 7,082,728 B1 * | 8/2006 | McConaughy et al. | ..... | 52/220.1 |
| 7,087,837 B1 * | 8/2006 | Gretz | ............... | 174/58 |
| 7,126,058 B2 * | 10/2006 | Herth | ............... | 174/58 |
| 7,173,184 B2 * | 2/2007 | Hull et al. | ............... | 174/58 |
| 7,176,377 B1 * | 2/2007 | Gretz | ............... | 174/58 |
| 7,279,635 B2 | 10/2007 | Hyde | | |
| 7,304,236 B1 * | 12/2007 | Gretz | ............... | 174/58 |
| 7,378,590 B1 * | 5/2008 | Herth | ............... | 174/50 |
| 7,462,775 B1 * | 12/2008 | Gretz | ............... | 174/50 |
| 7,485,805 B1 * | 2/2009 | Gretz | ............... | 174/50 |
| 7,518,061 B1 * | 4/2009 | Gretz | ............... | 174/58 |
| 7,547,844 B2 * | 6/2009 | Forbis | ............... | 174/58 |
| 7,557,296 B2 * | 7/2009 | Lemke | ............... | 174/50 |
| 7,557,308 B2 * | 7/2009 | Dinh | ............... | 174/481 |
| 7,582,827 B1 * | 9/2009 | Gretz | ............... | 174/50 |
| 7,645,937 B2 * | 1/2010 | Bhosale | ............... | 174/58 |
| 7,667,145 B2 * | 2/2010 | Dinh et al. | ............... | 174/480 |
| 7,816,604 B1 * | 10/2010 | Gretz | ............... | 174/58 |
| 8,152,013 B2 * | 4/2012 | Hendricks | ............... | 220/3.8 |
| 8,158,884 B2 * | 4/2012 | de la Borbolla | ............... | 174/54 |
| 8,445,779 B1 * | 5/2013 | Gretz | ............... | 174/53 |

(Continued)

*Primary Examiner* — Jeremy C Norris
*Assistant Examiner* — Nathan Milakovich

(57) ABSTRACT

A surface mount electrical box for mounting on walls with shallow wall cavities. The surface mount electrical box includes an outer frame with shallow sidewalls and a peripheral wall extending orthogonally from the sidewalls. Box sidewalls extend orthogonally from the peripheral wall and are closed by a back wall to form an electrical enclosure therein. Component connection points for an electrical component are included on the outer frame. A first fastening arrangement includes bosses on the outer frame for accepting fasteners therein for securing the surface mount box directly to the wall covering surrounding a shallow wall cavity. A second fastening arrangement includes apertures in the back wall for accepting fasteners therein for securing the surface mount box directly to the substrate underlying a shallow wall cavity.

17 Claims, 6 Drawing Sheets

(56) References Cited

U.S. PATENT DOCUMENTS

| | | |
|---|---|---|
| 8,497,424 B2 * | 7/2013 | Castaldo .................. 174/50 |
| 2008/0013909 A1 * | 1/2008 | Kostet et al. ................. 385/135 |
| 2008/0179071 A1 * | 7/2008 | Jolly .............................. 174/58 |
| 2008/0223599 A1 * | 9/2008 | Shen et al. ...................... 174/58 |
| 2013/0032372 A1 * | 2/2013 | Charbonneau .................. 174/59 |

* cited by examiner

SURFACE MOUNT ELECTRICAL BOX FOR SHALLOW WALL CAVITIES

FIELD OF THE INVENTION

This invention relates to electrical boxes for mounting electrical components to a wall and specifically to an electrical box that can be easily installed on a wall having a shallow wall cavity.

BACKGROUND OF THE INVENTION

Conventional electrical boxes for high voltage components are typically secured to a wall support member such as a stud. Installing such a conventional box in an old work or retrofit situation therefore requires that a stud be located within the wall, a cavity formed in the wall covering next to the stud, and nails, screws, or similar fasteners driven through from the box into the stud to secure the electrical box to the wall. The entire electrical box is positioned within the wall so that the front face of the box is essentially even with the wall surface. In such a retrofit application, the wall cavity is substantially equal to the depth of the stud or approximately 3.5-inches thereby affording plenty of depth to accommodate the conventional box within the wall cavity.

Unfortunately, there are some applications, such as recreational vehicles (RVs) and block walls, in which the walls are typically much shallower than for a conventional wall framed with studs. A cavity formed in such a wall in a retrofit situation is substantially shallow and will not accommodate a conventional electrical box.

What is needed therefore is an electrical box that can be mounted within a shallow wall cavity while still accommodating large electrical components such as ground fault circuit interrupters (GFCIs).

SUMMARY OF THE INVENTION

The invention is a surface mount electrical box for retrofitting on walls with shallow wall cavities such as walls in RVs (recreational vehicles) and in basement wherein concrete block walls are covered by furring strips and sheetrock. The surface mount electrical box includes an outer frame with shallow sidewalls and a planar front face. A peripheral wall extends orthogonally from the outer frame sidewalls to an inner periphery. Box sidewalls extend rearward from the inner periphery of the peripheral wall and are closed by a back wall to form a box member integral with the outer frame. The box member includes an electrical enclosure therein. The outer frame includes component connection points for connection of an electrical component thereto. Two fastening arrangements are provided with the surface mount box for securing it to a wall or similar surface. A first fastening arrangement, which is used for securing the electrical box to a wall having a wall covering capable of holding fasteners therein, such as panel board in an RV, includes bosses integral with the peripheral wall and outer frame sidewall for accepting fasteners therein for securing directly into the wall covering. A second fastening arrangement, which is used for securing the electrical box to a wall surface incapable of supporting fasteners but which includes a strong substrate such as concrete block, includes apertures in the back wall for accepting fasteners therein for securing directly into the substrate. Knockouts are provided on both the back wall and the box sidewalls for the passage of cables there through to the inner electrical enclosure.

OBJECTS AND ADVANTAGES

The surface mount electrical device box of the present invention provides several advantages over the prior art, including:

(1) As compared to conventional electrical boxes for installing balky electrical components such GFCIs or dimmer switches, the surface mount electrical box has a much shallower depth enabling it to be installed in shallow wall cavities.

(2) The surface mount box makes it possible to mount bulky electrical components in old work or retrofit situations with shallow wall cavities, such as in recreational vehicles or on block walls covered with sheetrock.

(3) The surface mount box includes a large inner cavity or volume which enables it to accommodate bulky electrical components.

(4) The surface mount box includes two fastening arrangements including one for mounting directly to the wall covering and one for mounting to the substrate under the wall covering.

These and other objects and advantages of the present invention will be better understood by reading the following description along with reference to the drawings.

TABLE OF NOMENCLATURE

Figure 1:
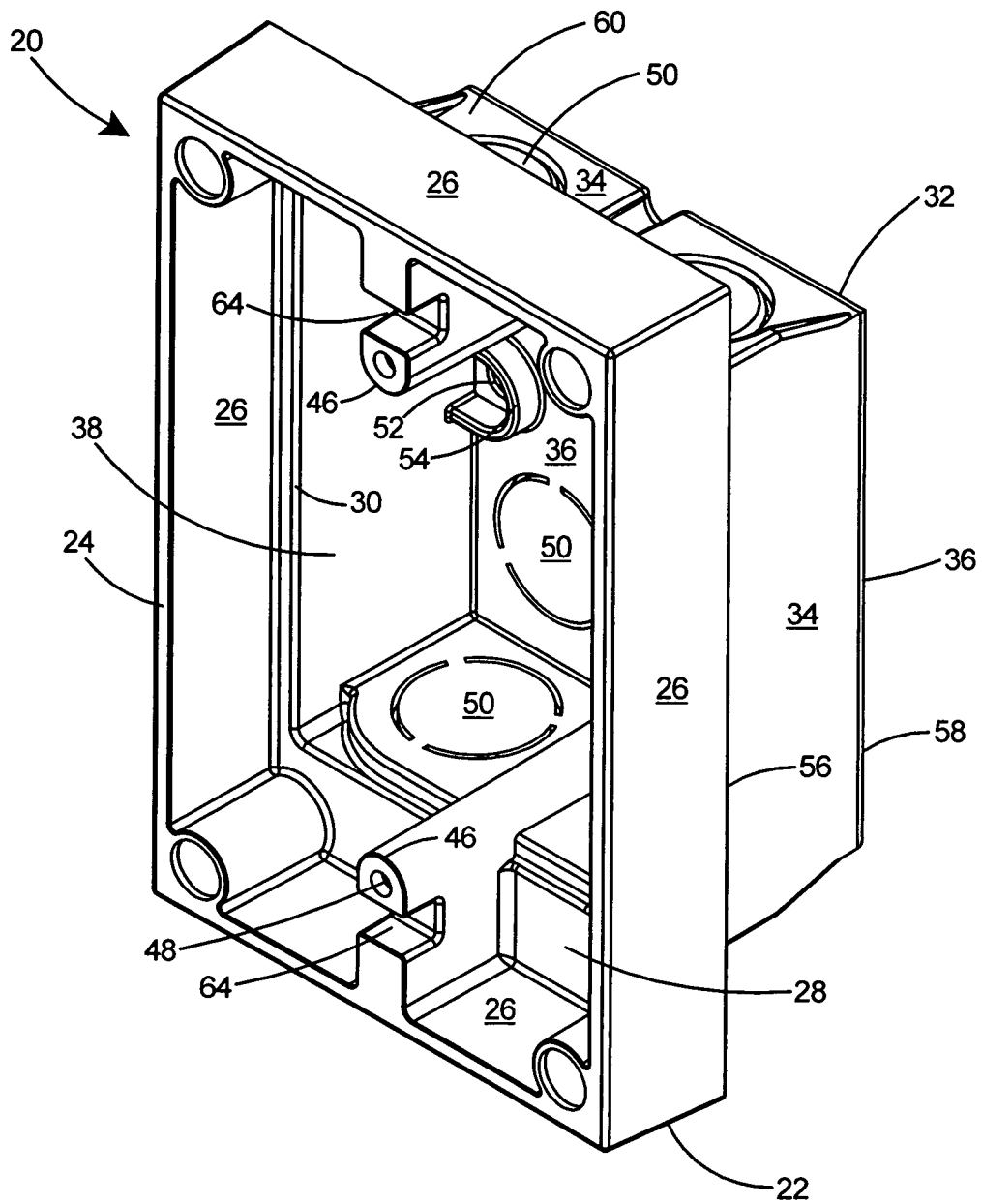
FIG. 1 is a perspective view of a preferred embodiment of a surface mount electrical box according to the present invention.

The following is a listing of part numbers used in the drawings along with a brief description:

| Part Number | Description |
| --- | --- |
| 20 | surface mount electrical box, preferred embodiment |
| 22 | outer frame |
| 24 | front face |
| 26 | sidewall of outer frame |
| 28 | peripheral wall |
| 30 | inner periphery |
| 32 | box member |
| 34 | box sidewalls |
| 36 | back wall |

-continued

| Part Number | Description |
|---|---|
| 38 | electrical enclosure |
| 40 | corner |
| 42 | frame boss |
| 44 | frame bore |
| 46 | component boss |
| 48 | component bore |
| 50 | removable wall portion |
| 52 | aperture |
| 54 | protective wall |
| 56 | first mounting surface |
| 58 | second mounting surface |
| 60 | recessed area |
| 62 | electrical fitting |
| 64 | groove |
| 66 | channel |
| 68 | outer end of bore in frame boss |
| 70 | countersunk entry |
| 72 | first fastening arrangement |
| 74 | wall surface |
| 76 | fastener |
| 78 | GFCI |
| 80 | fastener |
| 82 | cover plate |
| 84 | fastener |
| 86 | second fastening arrangement |
| 88 | block wall surface |
| 90 | fastener |
| 92 | substrate |
| D1 | depth of surface mount electrical box |
| D2 | depth of outer frame |
| D3 | depth of box sidewalls |
| D4 | inside depth of electrical enclosure |

DETAILED DESCRIPTION OF THE INVENTION

With reference to FIG. 1 there is shown the preferred embodiment of a surface mount electrical box 20 according to the present invention. The surface mount electrical box 20 includes an outer frame 22 having a planar front face 24 and four sidewalls 26. The sidewalls 26 of the outer frame 22 extend rearward from the front face 24 to a peripheral wall 28 that extends orthogonal to the sidewalls 26 to an inner periphery 30. A box member 32 extending rearward from the peripheral wall 28 includes box sidewalls 34 and a back wall 36 that closes the box member 32 and thereby creates an electrical enclosure 38 therein.

Referring to FIGS. 2-5, the surface mount electrical box 20 includes four corners 40 and a frame boss 42 extending between and integral with the adjacent sidewalls 26 at each of the corners 40. The frame bosses 42 extend the entire distance between the front face 24 and the peripheral wall 28 of the outer frame 22 and include frame bores 44 therein. Component bosses 46 extend from the peripheral wall 28 to the front face 24 and include component connection bores 48 therein. The box sidewalls 34 and back wall 36 include one or more removable wall portions 50 or knockouts therein. The back wall 36 further includes four apertures 52 therein and a protective wall 54 extending from the back wall 36 into the enclosure 38 and surrounding each of the apertures 52. The protective walls 54 help minimize the possibility of grounding of conductors that may occur with fasteners that are later inserted within the apertures 52.

Figure 3:
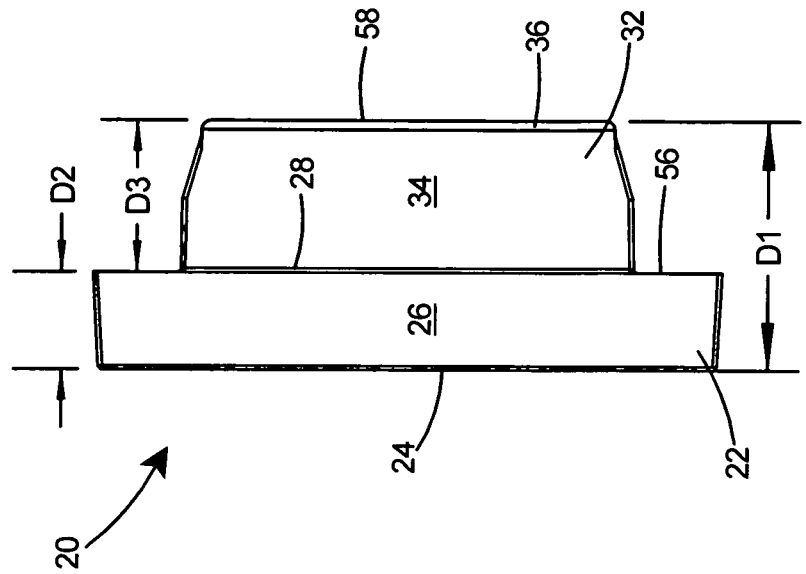
FIG. 3 is a side view of the surface mount electrical box of FIG. 1.
Figure 2:
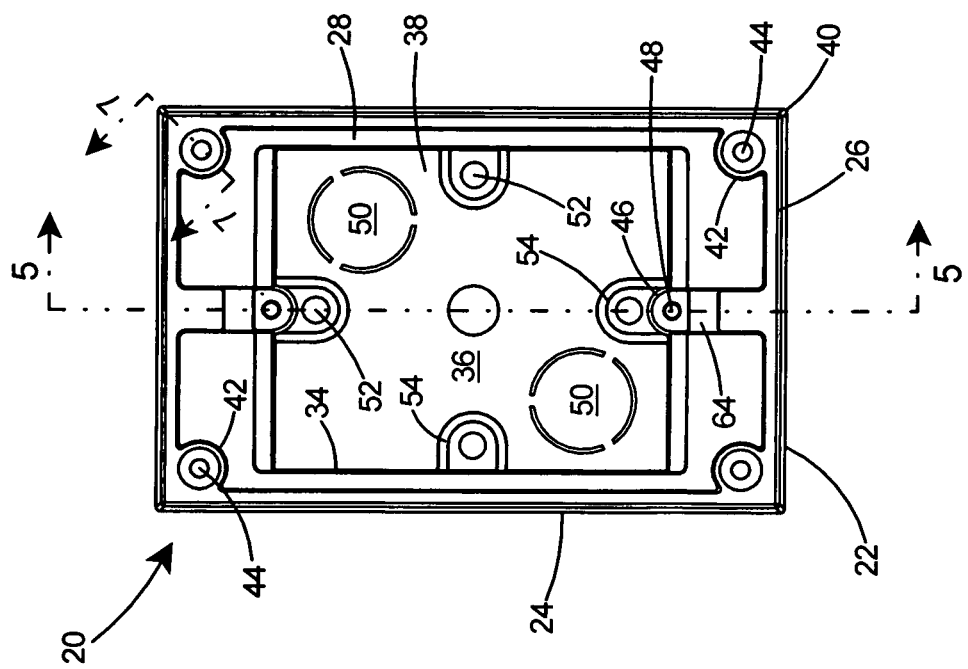
FIG. 2 is a front view of the surface mount electrical box of FIG. 1.
Figure 5:
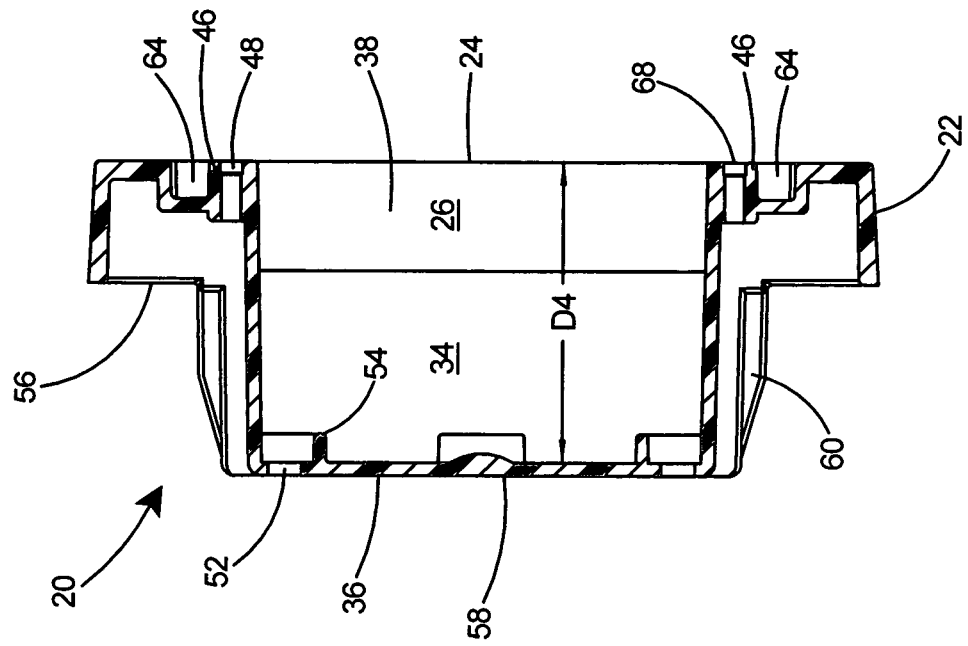
FIG. 5 is a sectional view of the surface mount electrical box taken along line 5-5 of FIG. 2.
Figure 4:
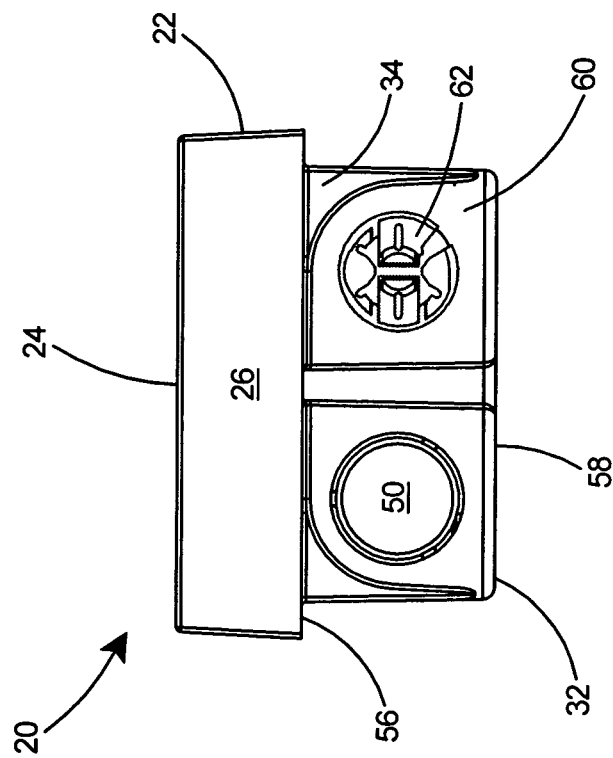
FIG. 4 is an end view of the surface mount electrical box of FIG. 1.

As shown in FIG. 2, the protective walls 54 are substantially C-shaped with the ends of the "C" integral with the box sidewalls 34. As shown in FIG. 3, the surface mount electrical box 20 includes a first mounting surface 56 at the rear of the peripheral wall 28 and a second mounting surface 58 at the rear of the back wall 36 of the box member 32. Some of the box sidewalls 34 are provided with recessed areas 60 therein to enable the receipt of electrical fittings 62, as shown in FIG. 5, within a knockout 50 while also enabling flush mounting of the fitting against the box sidewalls 34. Flush mounting of electrical fittings 62 within the recessed area 60 enable the box sidewalls 34 of the surface mount electrical box 20 to be slid easily within an opening in a wall (not shown) thus preventing the wall edges at the wall opening from catching the electrical fittings 62 and thereby impeding the progress of the surface mount electrical box 20 sliding into the wall opening. Grooves 64 are provided in the component bosses 46 outward of the component bores 48 and inward of the outer frame sidewalls 26 to enable an interference-free fit of the outer connectors of bulky devices such as GFCIs to fit within the electrical enclosure 38.

As shown in FIG. 3, a critical feature of the surface mount electrical box 20 of the present invention is the shallow depth D1 of the box which enables it to accommodate bulky electrical components in shallow wall cavities. The entire depth D1 of surface mount electrical box 20 is substantially shallow, preferably at most 2.06 inches. Of the total depth D1 of surface mount electrical box 20, outer frame 22 preferably has a depth D2 of no greater than 0.81 inch and box sidewalls 34 preferably include a depth D3 of no greater than 1.25 inches. The depth D2 of the outer frame 22 and the depth D3 of the box sidewalls 34 are both substantially shallow, thus enabling the box sidewalls 34 to easily fit within a shallow wall cavity and, when the surface mount box is mounted directly to a substrate such as a block wall, to minimize the distance the outer frame 22 extends from the wall. Thus, as shown in FIG. 5, the inside depth D4 the electrical enclosure 38 from the front face 24 to the back wall 36 is at most 2.0 inches. A preferred embodiment of the surface mount electrical box 20 having outer sidewalls 26 with an overall dimension of 3.3 inches by 5.1 inches would therefore include an internal volume within the electrical enclosure 38 of at least 20 cubic inches. Thus a preferred embodiment of surface mount electrical box 20 according to the present invention provides the unexpected result of ample and spacious interior volume to accommodate even bulky electrical components while advantageously limiting the total depth of the box to 2.06 inches to enable mounting in shallow wall cavities.

Figure 7:
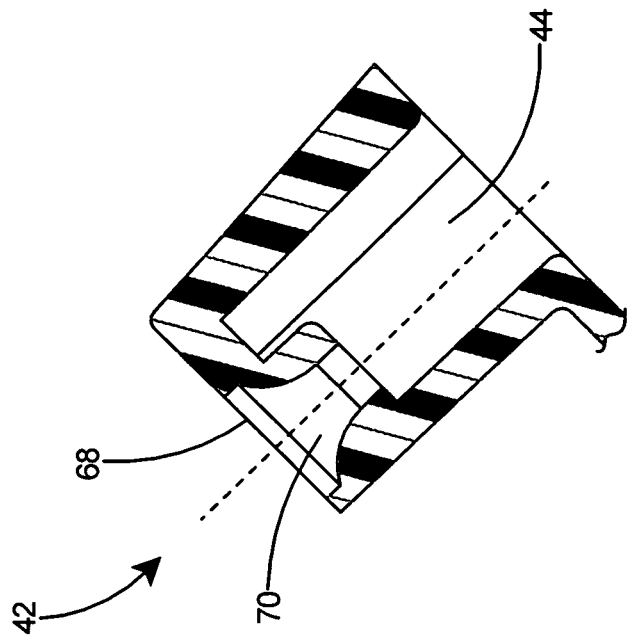
FIG. 7 is a sectional view of the surface mount electrical box taken along line 7-7 of FIG. 2.
Figure 6:
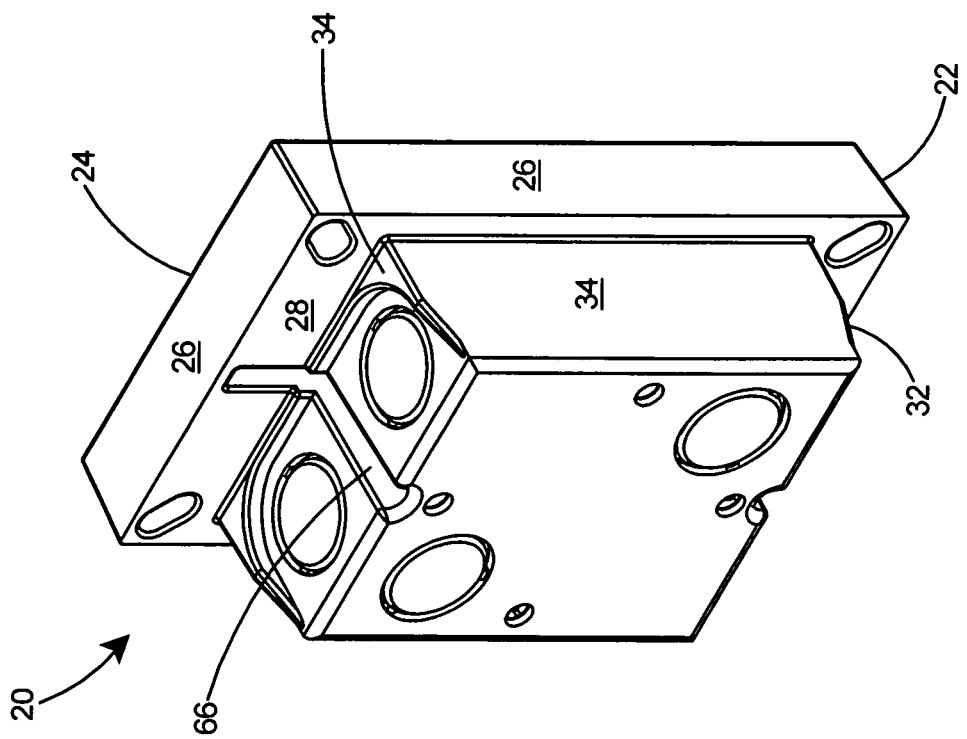
FIG. 6 is a rear perspective view of the surface mount electrical box of the present invention.

With reference to FIG. 6, the surface mount electrical box 20 further includes channels 66 formed in the sidewalls 34 of box member 32 and in the peripheral wall 28. The channel 66 is aligned behind the component bosses 46 and provides clearance for the ends of long fasteners (not shown) in the component bosses 46. As the surface mount electrical box 20 is preferably molded in one piece of plastic, the channels 66 also reduce the amount of plastic required to mold the surface mount electrical box and thus decrease the unit production cost. As shown in FIG. 7, the bore 44 in each frame boss 42 includes an outer end 68 and a countersunk entry 70 at the entrance of the bore 44 in the outer end 68. The countersunk entry 70 enables the head of a countersunk screw to be recessed therein, thus providing an attractive appearance to the surface mount electrical box 20 after it is installed. As shown in FIG. 5, the outer end 68 of the frame boss 42 is planar with the front face 24 of the surface mount electrical box 20.

Figure 8:
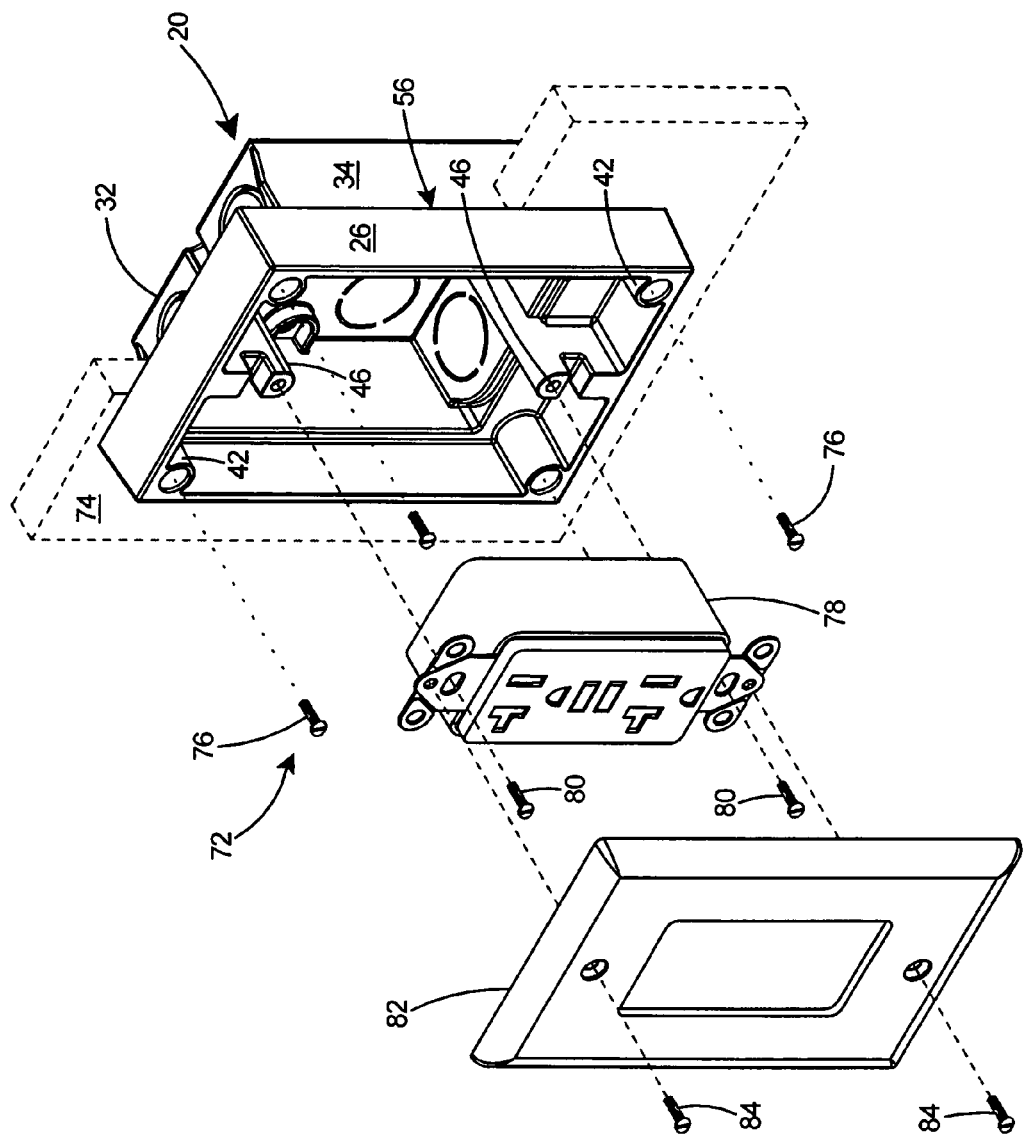
FIG. 8 is an exploded perspective view of the surface mount electrical box in alignment with a GFCI device to be installed on an RV wall using the first fastening arrangement.

Referring to FIG. 8, the surface mount electrical box 20 for shallow wall cavities includes a first fastening arrangement 72 for securing the electrical box to a wall surface 74 in which the wall surface has sufficient integrity to accept and hold fasteners therein, such as in an RV with a panel board wall covering. The first fastening arrangement 72 includes fasteners 76 driven through the frame bosses 42 in the outer frame 22 and directly into the wall surface 74. Typically, recreational vehicles include walls, such as panel board, with sufficient integrity for holding fasteners. Thus, in an old work or retrofit situation, an installer can simply form a hole in the wall large enough to accept the sidewalls 34 of the box member 32, slide the surface mount electrical box 20 into the hole until the first mounting surface 56 is flush against the wall surface 74, and then secure the box to the wall with the first fastening arrangement 72 by tightening fasteners 76. The surface mount electrical box 20 provides unexpected beneficial results when used in RV applications because the shallow depth D3 of the box sidewalls 34 (see FIG. 3) does not exceed the depth of the wall cavity. A GFCI 78 is shown in alignment with the component bosses 46 of the surface mount electrical box 20 to be installed therein with fasteners 80. Installation of the surface mount electrical box 20 is completed by securing a conventional decorative cover plate 82 to the GFCI 78 with fasteners 84 as shown.

Figure 9:
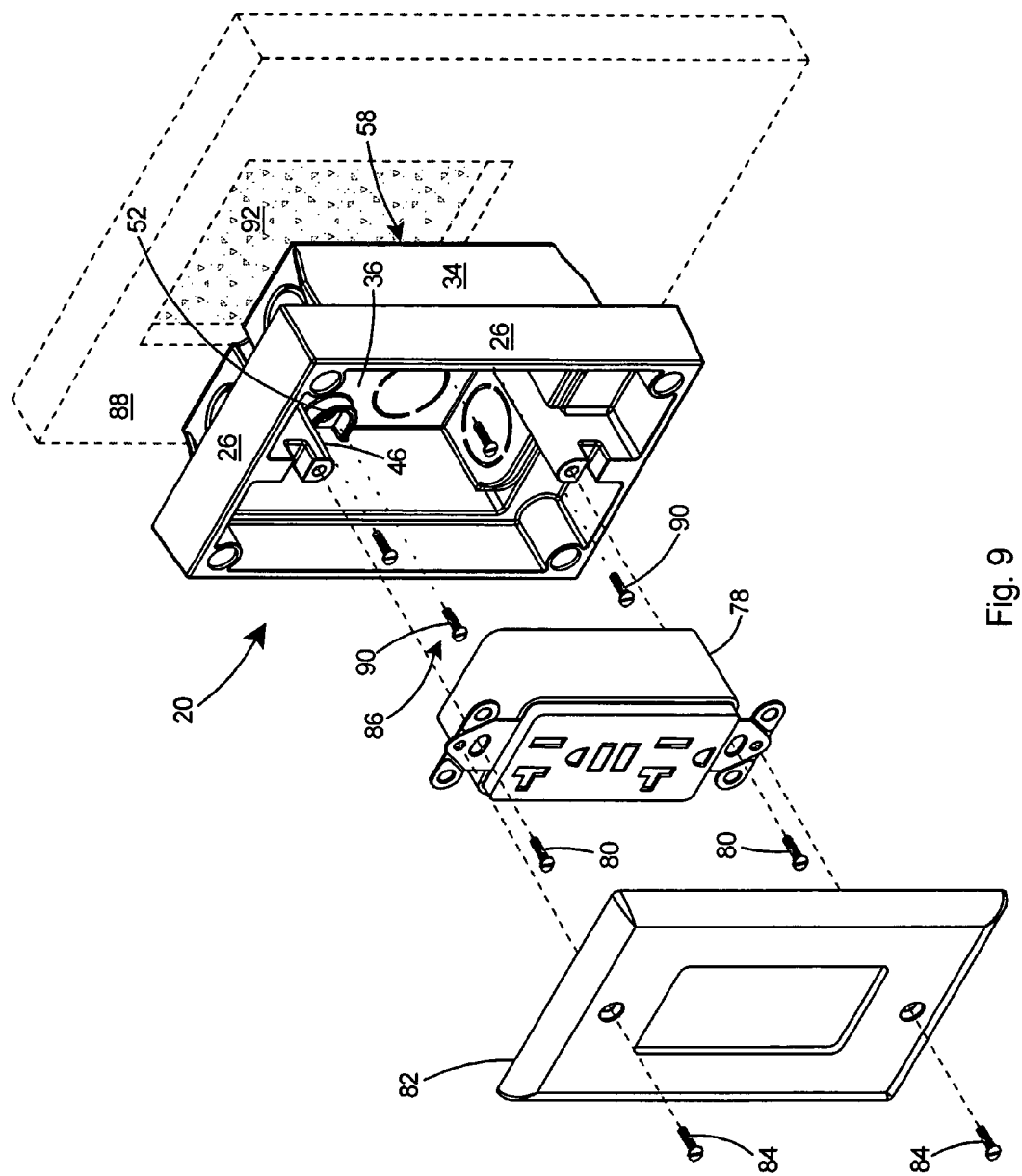
FIG. 9 is an exploded perspective view of the surface mount electrical box in alignment with a GFCI device to be installed on sheetrock with an underlying block wall using the second fastening arrangement.

Referring to FIG. 9, the surface mount electrical box 20 further includes a second fastening arrangement 86 for securing the electrical box to a wall surface 88 that does not have the integrity to hold fasteners therein but which includes a strong substrate, such as a concrete block wall covered with furring strips supporting sheetrock. The second fastening arrangement 86 includes fasteners 90 and the apertures 52 in the back wall 36 for securing the surface mount electrical box 20 directly to the underlying substrate 92. The second fastening arrangement 86 is the preferred method of attaching the surface mount electrical box 20 to a wall surface 88 in which the wall covering cannot support fasteners but which wall covering includes an underlying substrate capable of accepting fasteners. The second fastening arrangement 86 is therefore used to secure the surface mount electrical box 20 directly to the substrate 92. To install on a block wall, the installer cuts a hole in the wallboard and simply drills holes in the substrate or block wall 92 in a pattern to match the apertures 52 in the back wall 36 of the surface mount box 20. The surface mount electrical box 20 is then pressed against the wall until the back wall 36 is flush against the substrate 92. The installer then secures the box to the wall with the second fastening arrangement 86 by tightening fasteners 90 into the substrate 92. For substrates such as concrete block walls fasteners such as TAPCON® concrete screws, available from Illinois Tool Works, Inc., Glenview, Ill., can be used to secure the surface mount box 20 to the concrete block wall. The surface mount electrical box 20 provides unexpected beneficial results when secured to a block wall because the total depth D1 of the box 20 (see FIG. 3) is substantially shallow and therefore the surface mount box 20 does not extend as far from the surface as would a conventional electrical box.

As shown in FIG. 5, the surface mount electrical box 20 includes one or more knockout or removable wall portions 50 in the recessed area 60 of the box sidewalls 34. The recessed area 60 in the sidewall 34 enables the use of electrical fittings or connectors such as the BLACK BUTTON™ push-in fitting 62 or connector for connecting non-metallic cable to electrical boxes, which connector 62 is available from Arlington Industries of Scranton, Pa. The recessed area 60 enables installation of the fittings 62 in the knockouts 50 while preventing the fittings from projecting beyond the sidewall 34 and interfering with insertion of the surface mount electrical box 20 into wall openings.

The surface mount electrical box 20 may be constructed of metal or plastic. Most preferably the surface mount electrical box 20 is molded in one piece of plastic. Suitable plastics for molding the box include polycarbonate and polyvinylchloride.

Having thus described the invention with reference to a preferred embodiment, it is to be understood that the invention is not so limited by the description herein but is defined as follows by the appended claims.

What is claimed is:

1. A surface mount electrical box comprising:
an outer frame including sidewalls having a front face;
a peripheral wall extending orthogonally from said sidewalls to an inner periphery;
a box member including box sidewalls extending orthogonally from said inner periphery of said peripheral wall;
a back wall closing said box sidewalls and defining an electrical enclosure therein;
a first fastening arrangement on said outer frame for securing said surface mount electrical box to a wall having a wall covering capable of supporting fasteners therein;
said first fastening arrangement including a plurality of frame bosses on said outer frame and a fastener corresponding with each of said frame bosses;
a second fastening arrangement on said box member for securing said surface mount electrical box to a wall with a wall covering having an underlying substrate capable of supporting fasteners therein:,
said peripheral wall includes a first mounting surface;
mounting said surface mount electrical box to a wall with said first fastening arrangement includes inserting said box sidewalls through an opening in the wall until said first mounting surface is flush against the wall surface;
said surface mount box includes a shallow depth thereby enabling it to accommodate bulky electrical components in shallow wall cavities; and
said depth of said surface mount electrical box is at most 2.06 inches.

2. The surface mount electrical box of claim 1 wherein said second fastening arrangement includes
a plurality of apertures in said back wall of said box member; and
a fastener corresponding with each of said apertures.

3. The surface mount electrical box of claim 2 wherein said back wall includes a second mounting surface; and
mounting said surface mount electrical box to a wall with said second fastening arrangement includes placing said second mounting surface flush against the substrate.

4. The surface mount electrical box of claim 1 including
a plurality of component bosses extending from said peripheral wall to said front face of said outer frame; and
a component connection bore in each of said component bosses.

5. The surface mount electrical box of claim 4 including a groove in each of said component bosses, said groove outward of said component bores and inward of said sidewall of said outer frame.

6. The surface mount electrical box of claim 2 including a protective wall extending from said back wall into said electrical enclosure, said protective wall surrounding each of said apertures and minimizing potential grounding from conductors within said electrical enclosure.

7. The surface mount electrical box of claim 1 including
a recessed area in said box sidewalls; and
a removable wall portion said recessed area, said removable wall portion enabling the receipt an electrical fitting in said recessed area of said box sidewalls.

8. The surface mount electrical box of claim 1 wherein each of said frame bosses includes a bore therein, an outer end, and a countersunk entry at said outer end, whereby said countersunk entry enables the head of a countersunk screw to be recessed therein.

9. The surface mount electrical box of claim 1 wherein said outer frame includes four of said sidewalls and four corners at the juncture of said sidewalls.

10. The surface mount electrical box of claim 9 wherein each of said frame bosses is located at one of said corners.

11. The surface mount electrical box of claim 4 including
   a plurality of channels formed in said box sidewalls and in said peripheral wall; and
   said channels are aligned behind said component bosses.

12. The surface mount electrical box of claim 1 wherein said outer frame is substantially shallow and includes a depth of no greater than 0.81 inch.

13. The surface mount electrical box of claim 1 wherein said box sidewalls are substantially shallow and includes a depth of no greater than 1.25 inches.

14. The surface mount electrical box of claim 1 wherein said electrical enclosure is substantially shallow and has an inside depth as measured from said front face to said back wall of at most 2.0 inches.

15. The surface mount electrical box of claim 1 wherein said electrical enclosure includes an internal volume of at least 20 cubic inches.

16. The surface mount electrical box of claim 1 wherein said surface mount electrical box is molded in one piece of plastic.

17. The surface mount electrical box of claim 16 wherein plastic is selected from the group including polycarbonate and polyvinylchloride.

\* \* \* \* \*